(12) United States Patent
Garlington et al.

(10) Patent No.: US 9,555,337 B2
(45) Date of Patent: Jan. 31, 2017

(54) METHOD FOR TRACKING PHYSICAL PLAY OBJECTS BY VIRTUAL PLAYERS IN ONLINE ENVIRONMENTS

(71) Applicant: Disney Enterprises, Inc., Burbank, CA (US)

(72) Inventors: Joseph O. Garlington, Burbank, CA (US); Eric Haseltine, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 464 days.

(21) Appl. No.: 14/028,119

(22) Filed: Sep. 16, 2013

(65) Prior Publication Data

US 2015/0080121 A1    Mar. 19, 2015

(51) Int. Cl.
| | | |
|---|---|---|
| *G06F 17/00* | (2006.01) | |
| *A63H 30/04* | (2006.01) | |
| *A63H 27/00* | (2006.01) | |
| *A63F 13/65* | (2014.01) | |
| *A63F 13/327* | (2014.01) | |
| *A63F 13/235* | (2014.01) | |
| *A63F 13/211* | (2014.01) | |
| *A63F 13/335* | (2014.01) | |

(52) U.S. Cl.
CPC ............. *A63H 30/04* (2013.01); *A63F 13/235* (2014.09); *A63F 13/327* (2014.09); *A63F 13/65* (2014.09); *A63H 27/00* (2013.01); *A63F 13/211* (2014.09); *A63F 13/335* (2014.09); *A63F 2300/8023* (2013.01)

(58) Field of Classification Search
USPC ...................................... 463/30–33
See application file for complete search history.

(56) References Cited

U.S. PATENT DOCUMENTS

| | | | | |
|---|---|---|---|---|
| 9,041,739 | B2* | 5/2015 | Latta ...................... | A63F 13/48 345/633 |
| 2012/0086631 | A1* | 4/2012 | Osman ..................... | A63F 13/12 345/156 |
| 2014/0179428 | A1* | 6/2014 | Miura ...................... | A63F 13/12 463/31 |
| 2014/0364197 | A1* | 12/2014 | Osman ..................... | A63F 13/00 463/24 |
| 2014/0364215 | A1* | 12/2014 | Mikhailov .............. | G06F 3/013 463/31 |
| 2015/0209664 | A1* | 7/2015 | Haseltine ................ | A63F 13/00 463/31 |

* cited by examiner

Primary Examiner — Ronald Laneau
(74) Attorney, Agent, or Firm — Patterson + Sheridan, LLP

(57) ABSTRACT

Techniques are disclosed for tracking physical play objects by virtual or non-player characters in an electronic game environment. More specifically, techniques are disclosed for enabling a game system to track a physical toy object, using tracking information to update the game state, and transmitting updated game state to the toy object and update the toy state. Additionally, a player is able to control the physical toy object, and use the physical toy object to play a game. The game system may track a remote-controlled toy, a handheld toy, or the player himself or herself. The virtual feedback to changes in the physical environment results in a more immersive game experience for the player.

24 Claims, 11 Drawing Sheets

METHOD FOR TRACKING PHYSICAL PLAY OBJECTS BY VIRTUAL PLAYERS IN ONLINE ENVIRONMENTS

BACKGROUND

Field

Embodiments presented herein generally relate to an interactive gaming environment and play with physical toys. More specifically, techniques are disclosed for tracking a physical game play device or toy by a virtual non-player on the game screen, and using that tracking information to update the game state in real time.

Description of the Related Art

Video game developers continually seek to increase player immersion in gaming environments. Video games suffer from the same problem as paintings or movies: viewers generally perceive themselves as being outside of the painting and as only being an observer. A greater sense of immersion in a game is psychologically and emotionally more rewarding to the user because it makes it easy for the user to pretend they are actually experiencing the game from the inside, rather than from an external position—engaging their so-called "willing suspension of disbelief." Doing so increases user enjoyment of the game and leads to a more memorable and rewarding experience (as well as more popular and successful game titles).

While computer graphics have become more sophisticated, the user experience remains principally viewing a game through a display on a screen. Game systems feature the ability to respond to commands transmitted via a remote controller, but these commands are generally limited to controlling virtual avatars. Limiting player interaction to virtual avatars limits player immersion in the game environment and storyline to action on the screen.

SUMMARY

One embodiment presented herein includes a method for tracking physical objects by virtual players in an electronic game environment. This method may generally include receiving, by a first game console, tracking, orientation and other data from and about a physical toy object physically being controlled by a player, updating a game state based on the received said data, transmitting game state data to the physical toy object and rendering images displayed on a first display based on the updated game state.

In a particular embodiment, the tracking data includes position and movement data, which may include, for instance, absolute position and position relative to another object(s), orientation along any number of axes, velocity, acceleration in one or more directions and other state information about the physical toy object. Updating the game state based on the received tracking data may include updating a physical state of the physical toy object or updating software or computer hardware states within the physical toy object.

In a particular embodiment, this method may further include transmitting, over a network, the received tracking data to a second game console, wherein the second game console renders a representation of the physical toy object. Further, the second game console may itself receive tracking data from a second physical toy object. The images rendered by the first game console may include a representation of the second toy object. Similarly the second game console may transmit the tracking data received from the second physical toy object to the first game console. In response, the first and second game consoles each update a respective game state based on the tracking data received from the second physical toy object, creating, in essence a single play area (as perceived by the player or players engaged in the play) that more than one player can play within, even though that play area contains both physical and virtual play areas and that none of the physical play areas have to be in real physical proximity. In fact, the physical play areas may be separated by a considerable physical distance.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

One advantage of physical play object tracking is that physical play object tracking increases player immersion by enabling the virtual game state to cause changes in the physical object and the player controller, and vice versa. The tracking method also increases player immersion because controlling a physical object that responds to virtual game state changes opens a new facet of game play that was previously unavailable. Also, players can use their physical environment to complement their playing strategy in the game's virtual environment.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
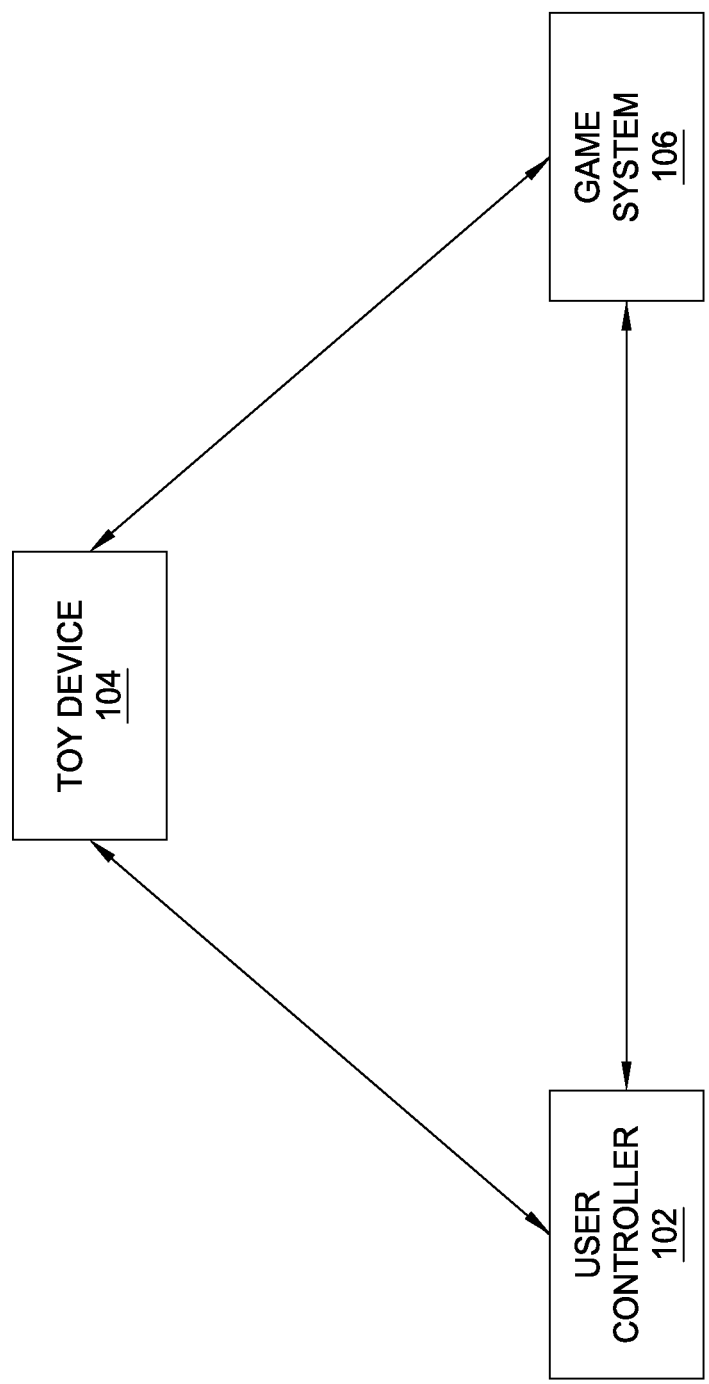
FIG. 1 illustrates components implementing a physical play object tracking system, according to one embodiment.

Embodiments presented herein provide techniques which allow virtual players and non-player characters (i.e., software controlled characters) to track objects in the real world as part of a joint physical and virtual interactive gaming environment. Physical play objects can be tracked in both a local environment as well as in networked multiplayer environments. In one embodiment, a player controller, a physical toy device, and a game system are used in conjunction with one another to provide an immersive interactive experience. In various embodiments, devices may communicate via radio waves, infrared waves, or other means of data transmission. The game system may track the physical play object using cameras or sensors. As a result of signal communications between the game system and the controller, the physical toy may react to changes in the virtual game environment and vice versa. The combination of the game tracking the physical object and the user controlling the physical object's motion creates a more immersive experience.

In one embodiment, a player uses a handheld controller (which may or may not be a physical toy, a traditional game controller or other object) to transmit inputs to a game system causing the game system to initiate an instance of game play. The player also uses the handheld controller to transmit input to a physical toy device, activating the toy device. Alternatively the physical toy device with its internally mounted sensors can serve as its own input controller. For example, after receiving controller input, a toy device representing a small helicopter could lift off the ground. Once in mid-air, the toy helicopter may represent an aircraft within the game environment piloted by the player in the physical environment. In such a case, the display may present a virtual environment as though it were the cockpit window of the helicopter. The game system may respond to the user piloting of the helicopter by updating the screen display (e.g., if the toy pivots left, the screen appears to veer right to show a changing environment). Note that the toy helicopter could be a "radio controlled" toy helicopter controlled externally by a handheld controller or could simply be a model of a helicopter held by a child and manipulated by the child directly as if it were being flown. Even so, because the model helicopter would contain sensors that track orientation, location, etc. it could become part of the overall play in the same way an actual flying toy helicopter could also become part of the overall play experience.

Further, the game may send input to the toy aircraft to cause the toy aircraft to move or emit sounds. For example, a game engine could track the three-dimensional position of the physical toy device and a non-player character rendered in the gaming environment—say, a virtual helicopter— could be programmed to "hunt" the physical helicopter, based on an assumed position within the virtual environment. Thus, if the virtual helicopter was able to successfully "shoot" the real helicopter floating near a display (as determined by the game engine and the estimated 3. D position of the helicopter), then the game engine could cause the physical helicopter to respond with recoiling, emitting sounds, descending to the ground, or with any other action relevant to game play. For example, a partial hit could result in the helicopter responding to user input as though the toy helicopter had been damaged, resulting in control system malfuncitons. Of course, those skilled in the art will recognize that in other embodiments the toy device may take the form of other vehicles or other types of objects relevant to game play.

In another embodiment, the controller may be shaped like a weapon, such as a gun, such that pressing a trigger on the controller results in gunshot sounds and recoil from perceived force. Controller input may also cause in-game changes such as the appearance of a virtual player being shot. Conversely, if a virtual player appears to shoot toward the player holding the toy gun controller, the controller may recoil from the perceived impact, emit sounds, or perform any other action relevant to game play. Similarly, the game system could provide feedback on screen indicating when the virtual player character successfully "shoots" the player. In another embodiment, if the gun-wielding player encounters a virtual gun-wielding player, the virtual player can appear to track the player's movements. In yet another embodiment, the virtual player may move his gun left or right in response to the player's gun moving left or right in the physical room.

Other embodiments of the physical toy device may take the form of a magic wand, a sword, a baton, or any other item usable as a game play object. In each embodiment, the game system tracks the physical object's position and reacts accordingly. The game system may also detect that a player is holding the toy device in a certain configuration, for example the game may respond to a toy gun only if the gun is pointed at the screen. The game system may also cause the virtual player to appear to respond in any other way relevant to game play. Note, the "game system" in these examples may be an external element or could be carried onboard one or more of the play objects directly.

In yet another embodiment, the toy device may simulate a character that actually participates in the game's storyline. Advances in the game storyline may cause the toy device to undergo changes such as movements, changes in color, appearance of damage, different sounds or movements, or any change in or to the toy that would increase a sense of immersion in the virtual game.

In another embodiment, multiple players in a room each have a handheld controller and/or toy device, each player transmits inputs to the toy device and the game system to play the game. The players may compete against one another or against a pre-programmed virtual player or players. The game system may track each device's movements and respond with in-game changes.

In yet another embodiment, players in different locations can compete against one another. A game system in each physical location, or a single game system that can coordinate the game between the multiple physical locations, may transmit inputs to and receive outputs from the other game system via a network connection. For example, a player may control a toy device in one location, and see an avatar representing the toy device of another player on screen. The other player and toy device being in a second location. The second player may view the first player's avatar on screen.

For example, consider again a flying toy helicopter. In a multiplayer game, each player could pilot the physical helicopter in one room via a controller. At the same time, a first game system could sense the position and movements of the helicopter and render a display of a virtual environment. The game system could then transmit information regarding the helicopter position to a second game system as well as receive information about a physical helicopter controlled by a player in a second location. Each player could attempt to pilot their physical helicopter and shoot down a rendering of the other helicopter rendered on a display. Note that full rendering of the images on the screen is not required. For instance players flying model helicopters in two different physical environments might see each other and each other's toy helicopters via a video connection with only elements like "tracer bullets" being drawn graphically by computers to show the overlay of the shooting action of the play. It is also possible computer graphics could be omitted, for example, each player could see his or her opponent's toy via video on their own screen. Lights, speakers and so forth in each toy would be the tools used to show that one helicopter had "hit" 'the other helicopter through the screen without having to draw any image on the screen itself. Of course, the particular combination of virtual and real elements may be tailored to the available toys, controllers, games systems, and mechanics of game play to present an immersive environment combining aspects of both the physical and virtual environments.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in one or more claims. Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as an "engine," "module" or "system." Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible or otherwise non-transitory medium that can contain or store a program for use by or in connection with an instruction execution system, apparatus, or device.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the invention may be provided to end users locally, through a local network or through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet. Indeed, the virtual machine images and storage resources described here are located in a cloud computing network.

FIG. 1 illustrates an environment 100 with components implementing a physical play object tracking system, according to one embodiment. As shown, a user controller 102 communicates with a toy device 104, and a game system 106. In one embodiment, communication between each device is two-way. Communication may take the form of radio waves, infrared waves, visible light, etc. In one embodiment, a player uses the user controller 102 to activate the game system 106 and the toy device 104. When turned on, the game system 106 may identify relevant objects for tracking, e.g., the toy device and/or the player. The game system 106 may use logic to filter out other physical objects within the viewable area of the game system 106, such as furniture. Alternatively, the toy device 104 may transmit electromagnetic waves to the game system 106, alerting the game system 106 to the presence of a relevant object to track, i.e. the toy device 104.

Once the game system 106 detects the presence of a relevant physical object, such as the toy device 104, the game system may determine a three-dimensional position of the toy device 104, e.g., by emitting electromagnetic pulses aimed at the toy device 104, or, e.g., by the toy device 104 using internal sensors to derive its location and then send that location to the overall game system. The game system may use sensors to receive electromagnetic waves that bounce back, and use the time elapsed during bounce-back from various points on the toy device 104 to calculate the approximate distance of the toy device 104 from the game system 106 and the toy's position in three-dimensional space. Alternatively, the toy device 104 may feature a specific emitter that "locks on" to signals from game system 106, such that the game system 106 and toy device 104 remain in contact as long as they are within a certain range. To track changes in position, the game system 106 may emit electromagnetic pulses at constant intervals to determine the change in position of the toy device 104. For example, if the user moves the toy device 104 left, the game system may recalculate the tracked position of the toy device 104 and calculate speed using the old and new position and time elapsed for the change in position. Then the game system 106 may input the position and speed information into game software to, for example, render the display to conform to changes in the position of the toy. For example, if a user controls a toy helicopter to "take off," the rendered image could show a simulated view from a helicopter cockpit lifting off from a helipad.

Similarly, the game system may register input from the user controller 102. In one embodiment, each button pressed on the user controller 102 may correspond to a certain sequence. Each button press may lead to discrete input directed at the toy device 104 or the game system 106. In one embodiment, each sequence may be used to modulate a specific carrier frequency of the electromagnetic waves emitted from the controller and directed at the toy device 104 or the game system 106. The toy device 104 and the game system 106 may input the various frequencies into game software logic to run the game. Input from the toy device 104 directed at the game system may be distinguishable from input related to the toy's position and speed. For example, if the toy device is supposed to "fire shots", the toy device position input and toy device "shots" may be transmitted over different carrier frequencies. Or different toy actions may correspond to different bit patterns in a set of bits, the carrier frequency being modulated using a specific pattern. The sensors in the game system 106 can register the different patterns and input the patterns into game software, leading to in-game changes.

Figure 2:
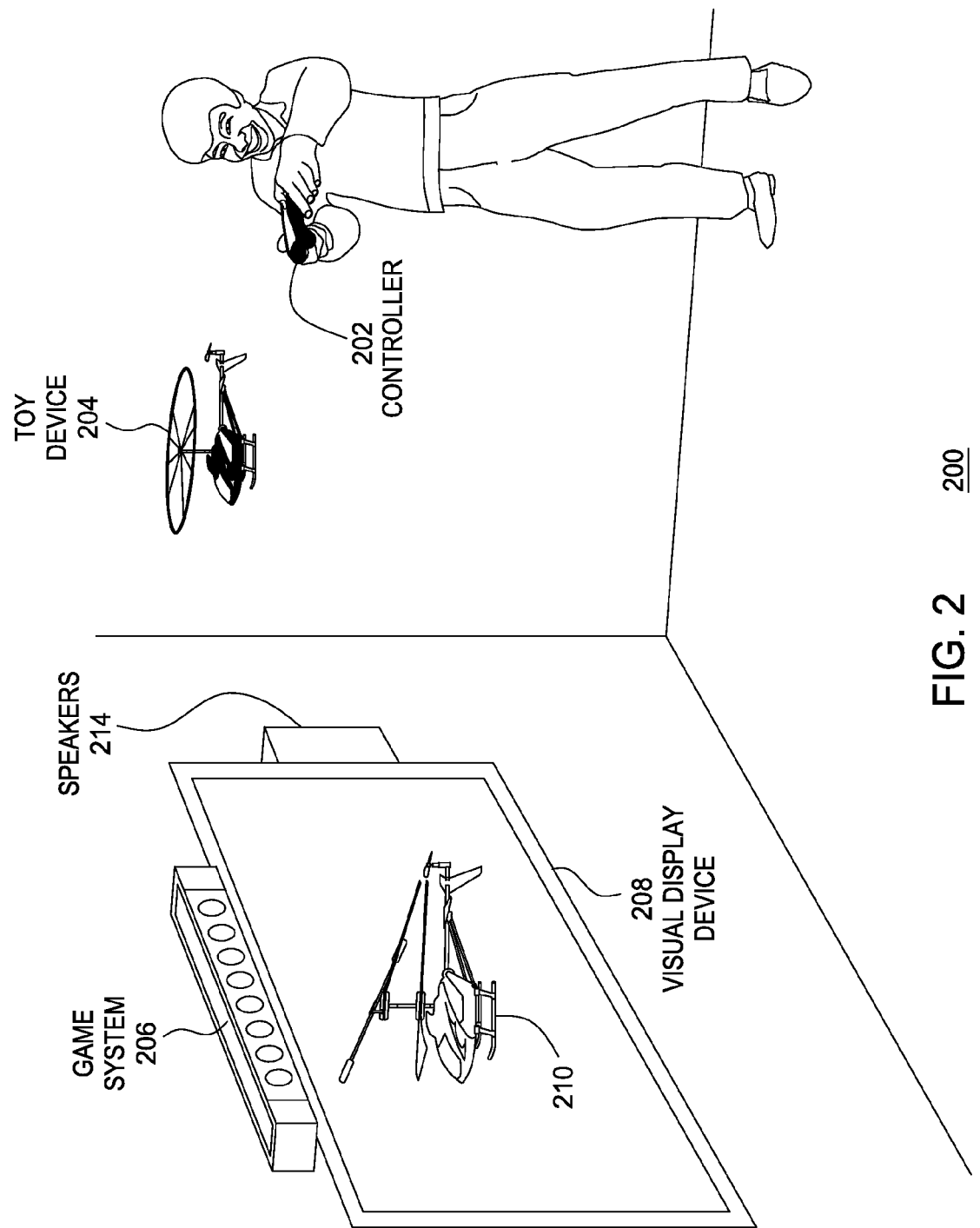
FIG. 2 illustrates an example of play object tracking, according to one embodiment.

FIG. 2 illustrates an environment 200 with an example of play object tracking, according to one embodiment. In one embodiment, a player uses a controller 202 to control a toy device 204. The toy device 204 sends and receives outputs and inputs from a game system 206. The game system 206 is connected to a visual display device 208, which displays the visual component of the game. The visual display device 208 may include speakers 214. In one embodiment, the game system 206 causes the visual display device 208 to display an avatar 210 from a game. The user uses the controller 202 and toy device 204 to play the game. For example, the user may play a game where the objective is to "shoot down" the avatar 210 using "bullets" from the toy device 204. A related objective may be to avoid incoming "fire" from the avatar 210 to protect the toy device 204. The larger objective may be to fly one's toy device through a virtual world, fighting various enemies and scoring points along the way.

Figure 3:
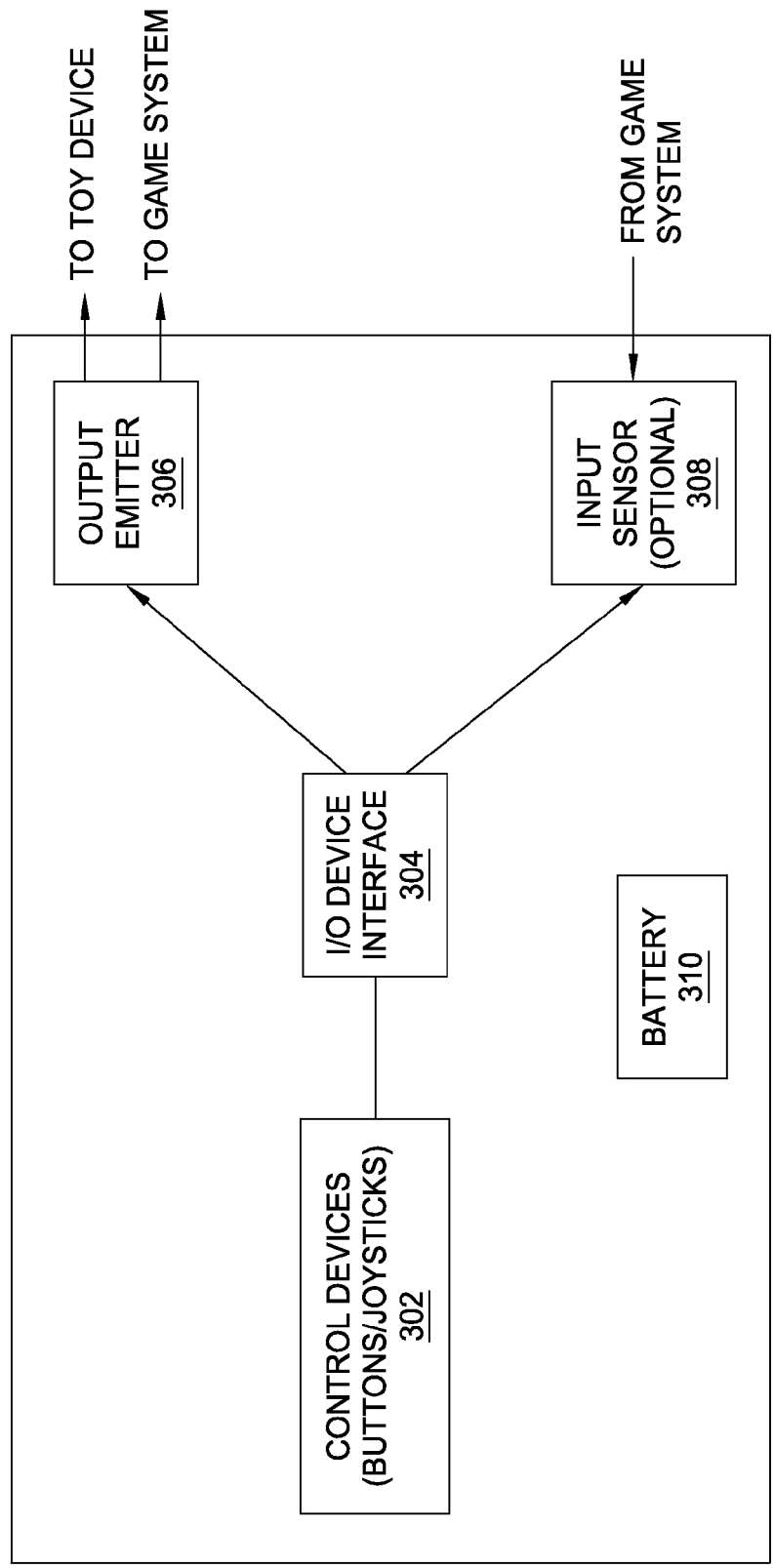
FIG. 3 illustrates an example controller showing components used in physical play object tracking, according to one embodiment.

FIG. 3 illustrates an example controller 300 showing components used in physical play object tracking, according to one embodiment. As shown, the controller 300 includes a control device set 302 (e.g. buttons, joysticks, levers, or other input sensors), an input/output (I/O) device interface 304, an output emitter 306, an optional input sensor 308, and a battery 310. In one embodiment, a player holds the user controller and provides input using the control device set 302. Input from the player transfers via the I/O device interface 304 to the output emitter 306, for transmission to the toy device and the game system. The user controller 300 is thus used to control a toy device or other physical object. In another embodiment, the player may use the user controller 300 to activate the toy device, to cause the toy device to move around or emit sounds, or to perform other actions. The user controller 300 may also receive input back from the game system via an input sensor 308, which may cause the controller to buzz or shudder or provide other haptic feedback to the player as part of game play, thereby increasing game immersion. A battery 310 provides power to components of the user controller 300. In one embodiment, the battery 310 comprises disposable or rechargeable batteries. In another embodiment, the battery 310 may be rechargeable externally. Note, the controller 300 may also include a variety of sensing mechanisms, e.g., to measure acceleration, orientation, velocity, relative position to other objects and absolute position in the play space. Doing so allows the game system to control the play and the relationships to real and virtual objects through the direct manipulation of the physical toy object without having necessarily to use buttons or joysticks.

Figure 4:
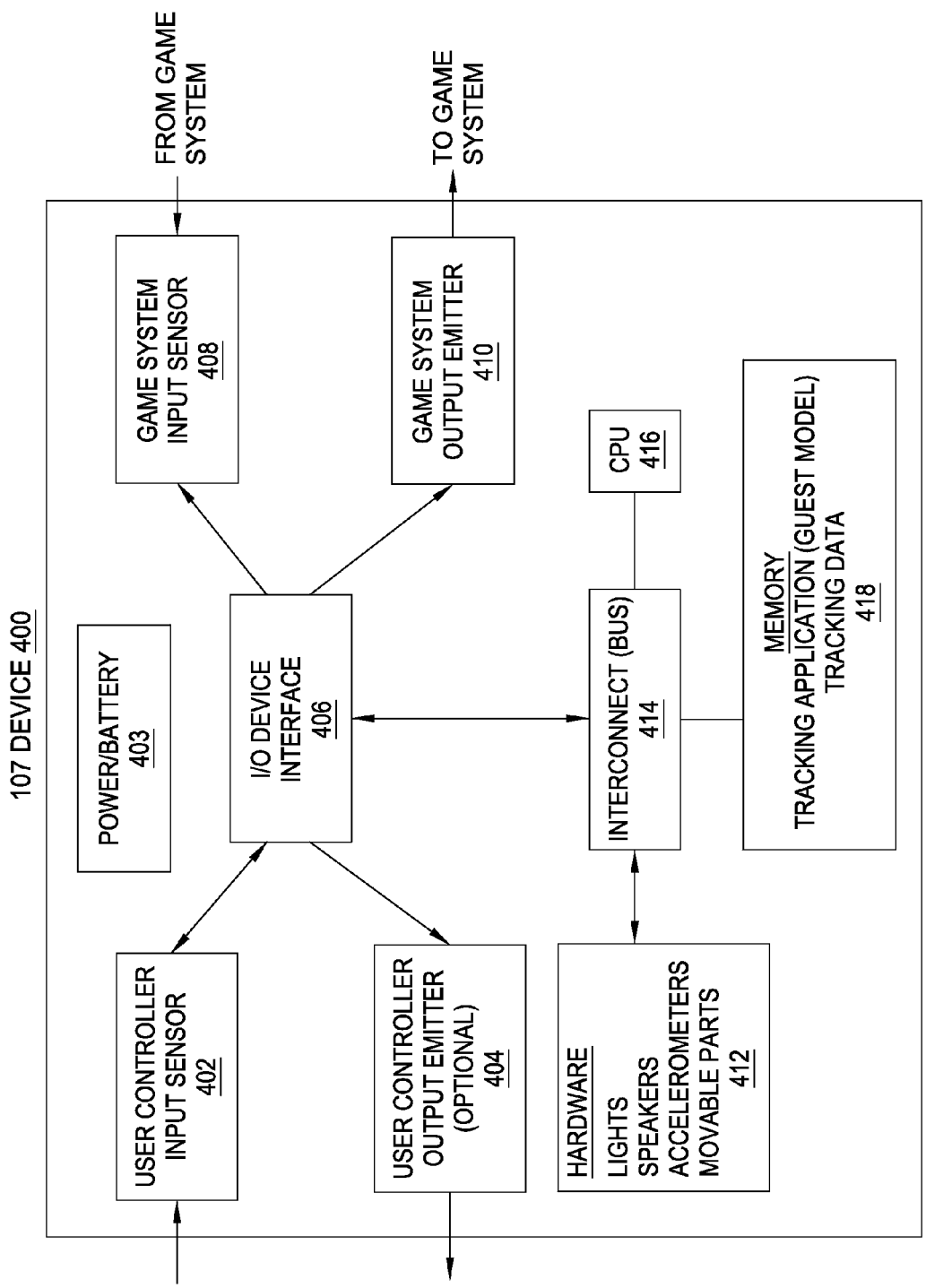
FIG. 4 illustrates an example toy device, configured to interact with a gaming environment, according to one embodiment.

FIG. 4 illustrates an example toy device 400, configured to interact with a gaming environment, according to one embodiment. As shown, the toy device 400 receives inputs from the user controller via an input sensor 402. Optionally, the toy device may also directly output to the user controller via an output emitter 410. The toy device 400 also receives inputs from the game system via an input sensor 408, and sends outputs to the game system via an output emitter 410. In one embodiment, the toy device 400 sends all input and output data to an I/O device interface 406, which connects via an interconnect bus 414 to a hardware set 412, a central processing unit (CPU) 416, and a memory unit 418. The memory unit 418 contains a guest module of the tracking application software that implements tracking, plus associated tracking data. The memory stores information needed to the track game states both within any current game, and also over time, between play sessions so that a player may 'level up,' etc., as is done in many games.

In one embodiment, the hardware set 412 may comprise toy lights, speakers, accelerometers, other movable parts, or any other hardware that the tracking application software may control or derive input from, using inputs received from the user controller and the game system. The hardware set 412 (and any associated software components) could serve to send/receive user inputs or outputs. The CPU 416 provides processing power to run the commands of the tracking application software. The hardware set 412 may include a variety of additional components, including, e.g., any number of devices for measuring how players may be manipulating the toys.

Figure 5:
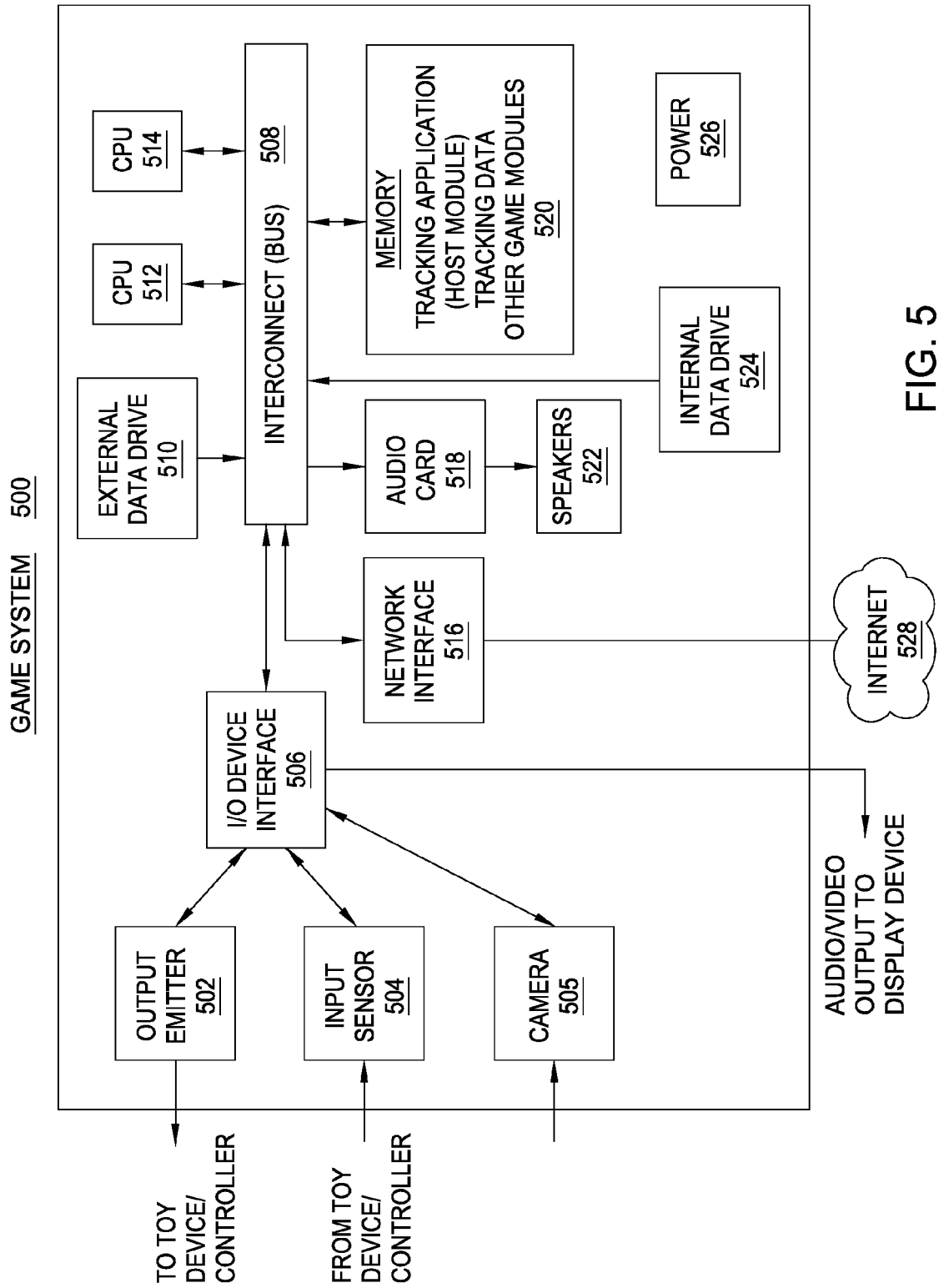
FIG. 5 illustrates an example game system with components configured to track physical play objects, according to one embodiment.

FIG. 5 illustrates an example game system 500 with components configured to track physical play objects, according to one embodiment. As shown, the game system includes an output emitter 502, an input sensor 504, and a camera 505 connected to an I/O device interface 506. In one embodiment, the I/O device interface 506 connects via an interconnect (bus) 508 to an external data drive 510, a central processing unit (CPU) 512, a graphics processing unit (GPU) 514, a network interface 516, an audio card 518, memory 520, and an internal data drive 524. CPU 512 is included to be representative of a single CPU, multiple CPUs, a single CPU having multiple processing cores, and the like. And the memory 520 is generally included to be representative of a random access memory. Although shown as a single unit, the internal data drive 524 may be a combination of fixed and/or removable storage devices, such as fixed disc drives, or optical storage, etc. In one embodiment, the external data drive 510 receives game data from some computer-readable storage medium containing game software and data, such as a CD or DVD disc. The CPU 512 provides processing power to execute the tracking application software, the GPU 514 provides processing power to render the visual display of the game, and the network interface 516 connects the game system to the Internet. The audio card 518 processes sound data and provides the processed sound data to speakers 522. The network interface 516 connects the game system to the Internet 528, enabling online multiplayer game play with players in other physical locations. A power unit 526 may connect to an external source to electrically power the game system.

In one embodiment, the internal data drive 524 stores game software and data, which may be downloaded to the internal data drive 524 from the computer-readable storage medium provided to the external data drive 510. In another embodiment, the memory unit 520 stores a host module of a tracking application. In one embodiment, the tracking application such that a host module (residing on the game system) interacts with any compatible guest module that may be running in toy device memory (as shown previously in FIG. 4).

During game play, the input sensor 504 receives tracking data from the toy device or controller and this data flows to the memory unit 520 via the interconnect 508. Tracking application software running in the memory unit 520 processes the incoming tracking data (such as data input into speed and three-dimensional position variables), providing that data to other game software modules also running within memory unit 520. The game software may then update the game play state and transmit the new state back to the tracking application software. The tracking application may then output the new game state back to the toy device via the output emitter 502. In addition, the camera 505 may capture images of the players interacting with a game.

Further, in one embodiment, the game system 500 may interact with another system to create a multi-user gaming environment. For example, the video stream captured by camera 505 may be transmitted to the other game system, where it is rendered on a display to game participants. In effect, game-play activity in the real world performed by one game participant (or group of participants) at one location is rendered as a virtual environment to a second game participant (or group of participants) at a second location, and vice-versa. That is, the display at each location presents the video captured at the other—connecting the two real-world environments by presenting a virtualized environment to each one. Further, the virtualized environment could be the actual video stream, but could also provide a variety of augmented reality components. For example, assume a player at the first location shoots a physical toy weapon pointed at the display screen—in an attempt to shoot a rendering of another player at a second location—the display at the second location could show a virtual rendering of the gun firing (e.g., a ray-gun like rendering). Similarly, the entire video stream could be processed using a variety of computer graphics (CG) effects. For example, the players could be rendered using a variety of transformations or texture overlays, e.g., a participant could be rendered with a texture effect to appear as an alien.

Figure 6:
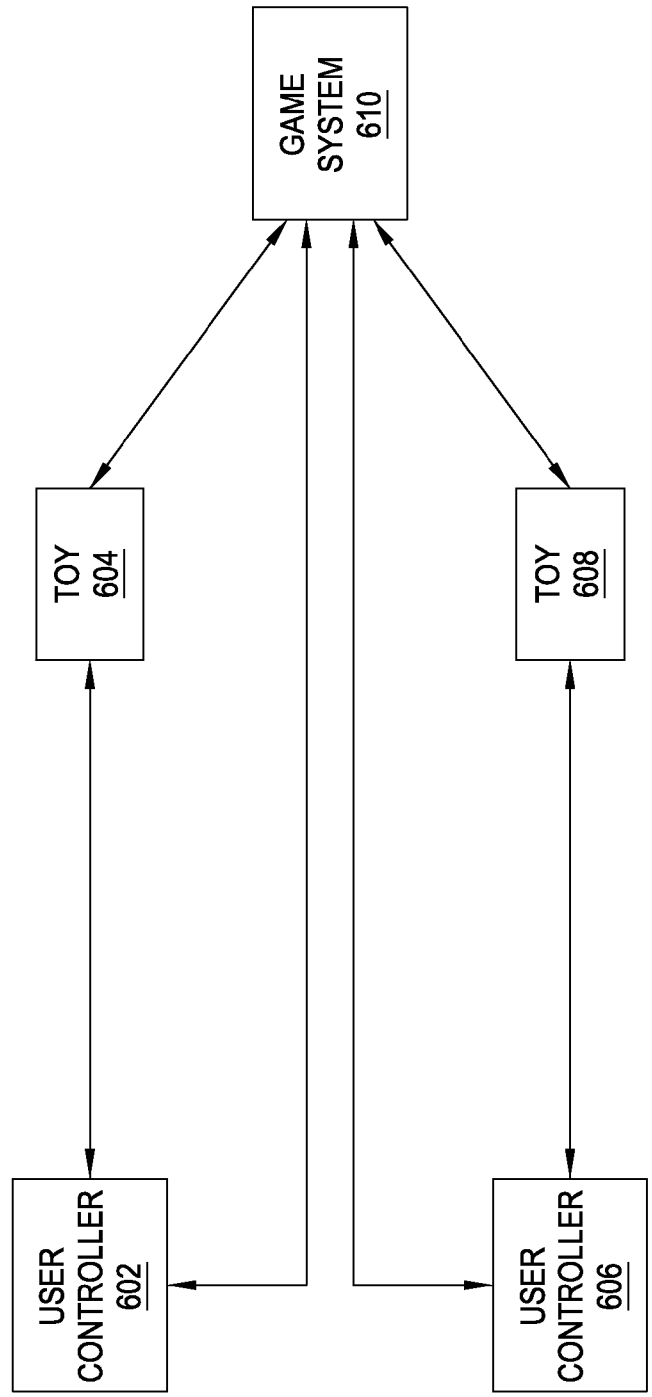
FIG. 6 illustrates play object tracking in a local area network environment, according to one embodiment.

FIG. 6 illustrates play object tracking in a local environment 600, according to one embodiment. That is, FIG. 6 illustrates an environment 600 with game players in a common physical location. As shown, a user controller 602, a toy device 604 and a game system 610 are connected via a data communications link. Also, a user controller 606, a toy device 608, and the game system 610 are connected via a two-way link. In one embodiment, a player can operate a user controller to control the corresponding toy device, such that two players may play a game involving virtual players or non-player characters interacting with the physical toys. Note, the example of FIG. 6 includes two players, but the embodiments may include more than two players, using the same configuration between the user controllers, the toy devices, and the game system. As noted above, the toy device itself may double as the "user controller." For example, a toy helicopter could be integrated with accelerators, network communication hardware, etc. In such a case, a child holding the toy helicopter could "fly" the helicopter by moving about a room. In response, the game system could evaluate the movements and update a virtual environment accordingly, as well as update a "state" of the helicopter or play sound effects, and the like. Further, the "game system" can be integrated with or the "toy" itself or communicate with the game system using the data communication link.

Figure 7:
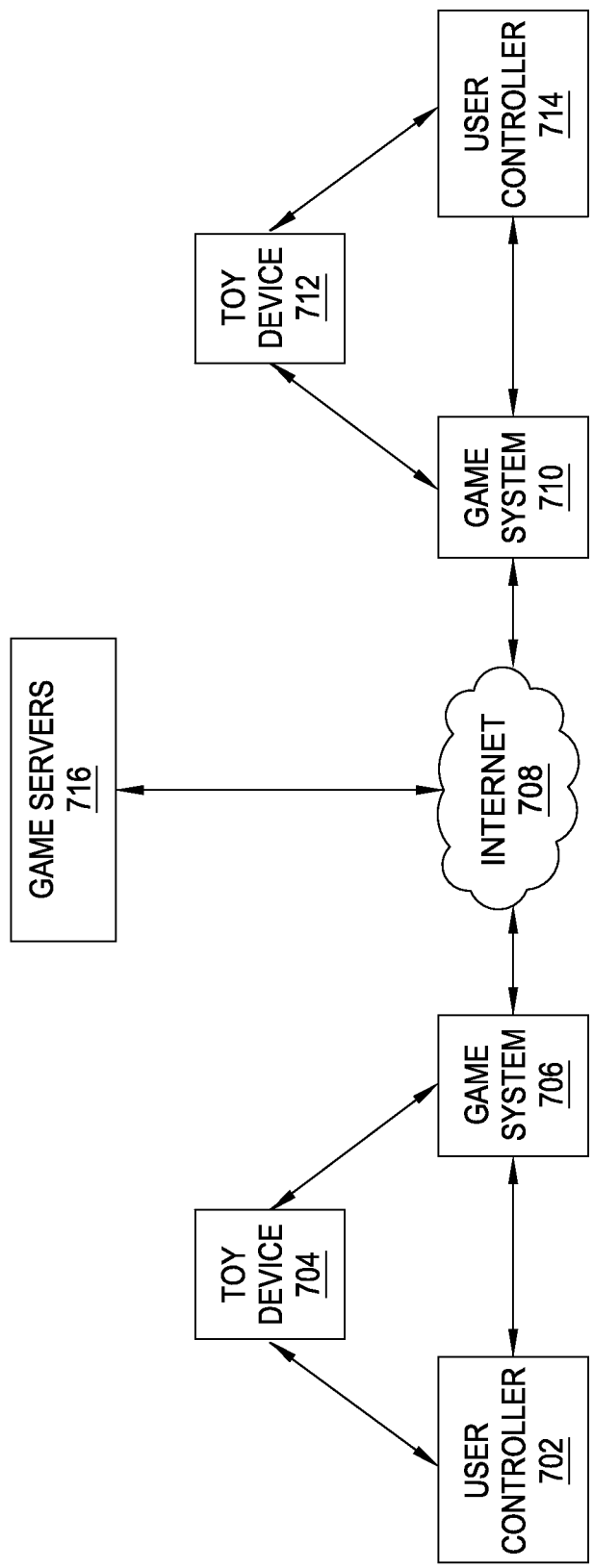
FIG. 7 illustrates physical play object tracking in a wide area network environment, according to one embodiment.

FIG. 7 illustrates physical play object tracking in multiple environments 700, according to one embodiment. As shown, a user controller 702, a toy device 704, and a game system 706 connect with each other via two-way link. In one embodiment, the game system 706 connects to another game system 710 via an Internet connection 708. In turn, the game system 708 is connected to a toy device 712 and a user controller 714, all in a separate physical location. Over the Internet connection 708, players may play a game that implements tracking. In one embodiment, a player uses the user controller 702 to control the toy device 704 to play a game, and the game system 706 transmits game state data resulting from inputs from the user controller 702 and the toy device 704 to the other game system 710, over the Internet connection 708. In turn, the game system 710 receives game inputs from the user controller 714 and the toy device 712 and transmits these via the internet connection 708. FIG. 7 illustrates only a two-player embodiment, but other embodiments may also implement physical play object tracking with more than two players, and increase player immersion. In yet another embodiment, the Internet-linked game systems may receive game data via the Internet connection 708 from game servers 716, residing in yet another physical location. These game servers may be used to store tracking information, game statistics, or any other information relevant to game play. Of course, external game servers are not required. For example, the toy devices may act as their own servers, coordinating between themselves rather than relying on an outside controller. In such a case, games (or individual scenarios for games) could be downloaded to the toy devices from an external system.

Figure 8:
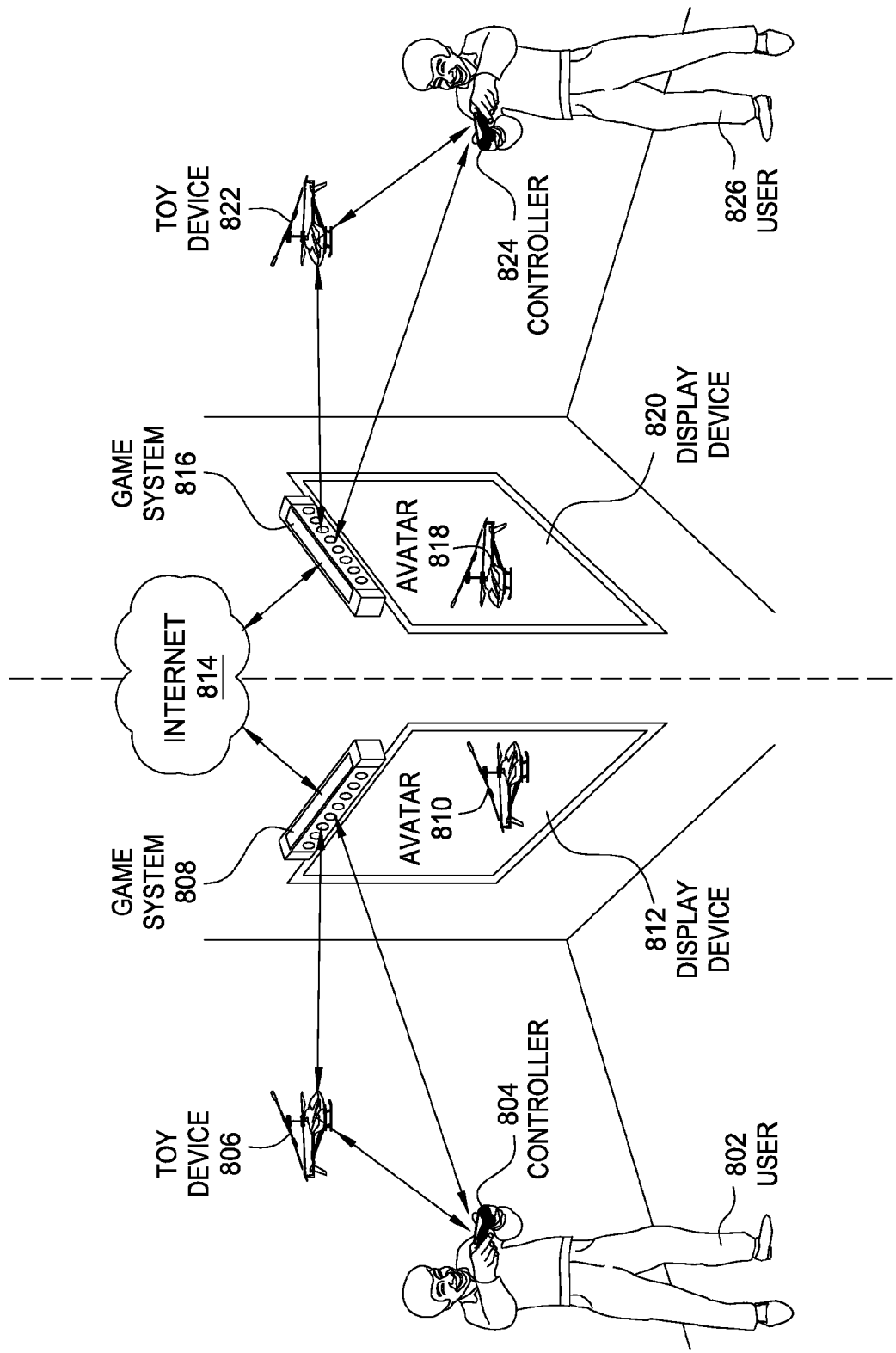
FIG. 8 further illustrates a multiplayer system configured with physical play object tracking, according to one embodiment.

FIG. 8 further illustrates a multiplayer environment 800 configured with physical play object tracking, according to one embodiment. As shown, a user 802 uses a controller 804 to control a toy device 806. The controller 804 and toy device 806 also communicate with a game system 808. The game system 808 connects to a display device 812, which displays an avatar 810, from a particular game. In one embodiment, the game system 810 connects to another game system 816 via a network connection 814. The game systems 808 and 810 may each include a camera used to stream video data to the other game system. In turn, the game system 816 connects to a controller 824 (used by a user 826), and a toy device 822. Also, the game system 816 connects to a display device 820, which displays an avatar 818, from a particular game. The physical toy device 806 corresponds to the virtual avatar 818 on display device 820. The physical toy device 822 corresponds to the avatar 810 on display device 812. The toy devices 806 and 822 are shown to resemble helicopters but any toy device, whether handheld or not, may be tracked. Game data is transmitted back and forth between the game system 808 and the game system 816 via the network connection 814 as both game systems send and receive data to and from their respective toy devices and user controllers. FIG. 8 illustrates a two-player embodiment, but embodiments involving more than two players may also implement the tracking method, and increase player immersion.

Figure 9:
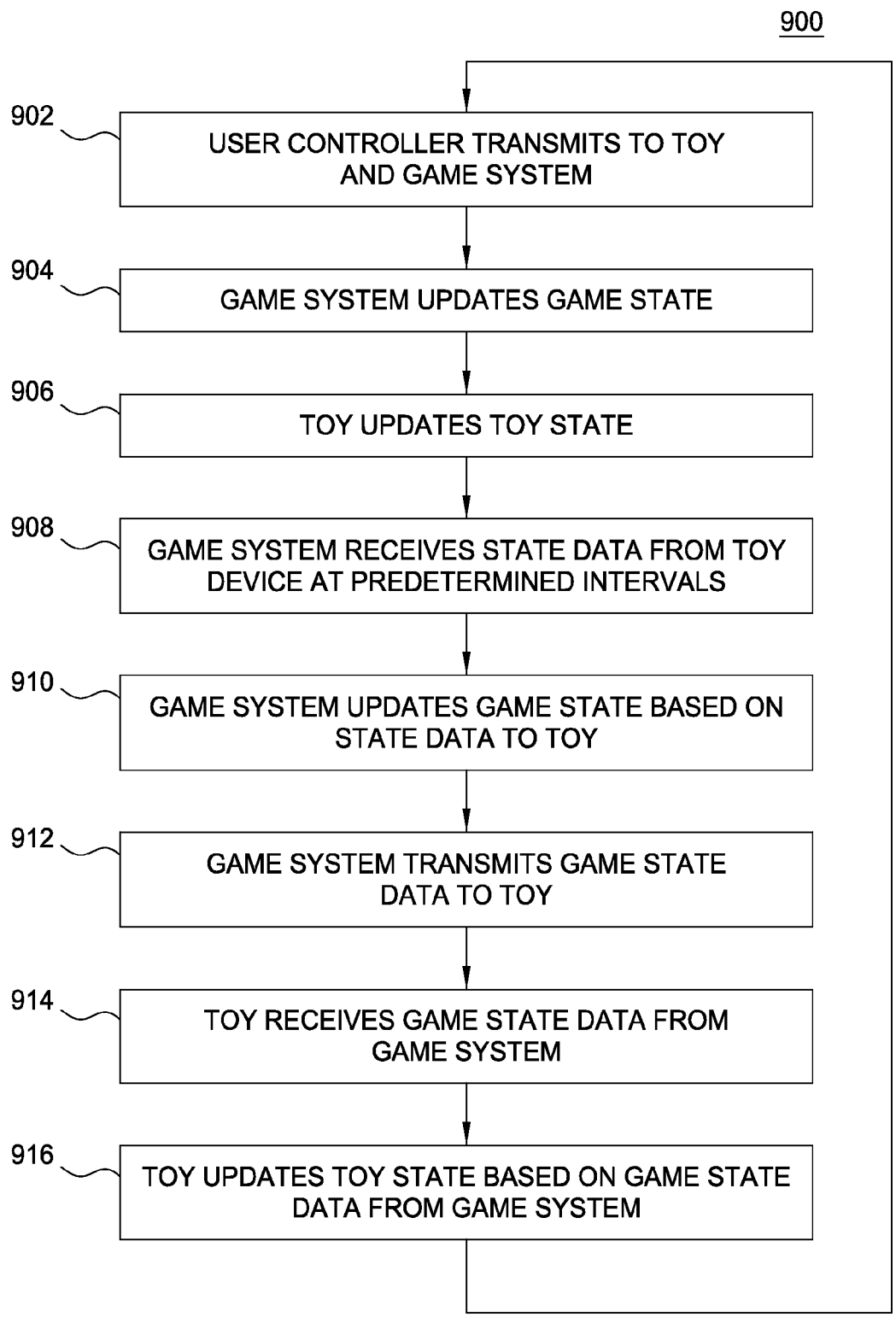
FIG. 9 illustrates a method for tracking physical play objects in a single-player game configuration, according to one embodiment.

FIG. 9 illustrates a method 900 for tracking physical play objects in a single-player game configuration, according to one embodiment. As shown, the method 900 starts at step 902, where a player operates a controller (e.g. buttons, joysticks etc.) to send inputs to a toy device and game system. At step 904, the game system uses the controller inputs to update a game state. For example, the player might initiate a game play session, register the presence of the toy device, incorporate the toy device in a game session, or similar actions. In other examples, controller inputs may be such that pressing a controller button results in the toy device "firing" a weapon, or "throwing" a ball, and the like. At step 906, the toy device updates the game state in response to user input, such as changing the speed, position, etc. At step 908, the game system receives the toy state data from the toy device. At step 910, the game system updates the game state leading to changes in the ongoing game play session. For example, the game state may update to reflect the player's toy device registered a "hit" on a virtual opponent. Similarly, the game system may control a non-player character in response to the user input, e.g., by hunting the player controlled toy device. In any case, the game state may render updated visuals reflecting a change in position, update the player's score, and the like. At step 912, the game system transmits new game state data to the toy (and optionally to the controller as well). For example, this may be causing the toy to emit sounds in case the toy device's virtual opponent "fires" back and scores a "hit". The "hit" may cause the physical toy device to drop to the ground, or recoil. At step 914, the toy receives the new game state data via its input sensors. At step 916, the toy updates an internal state based on the game state data. Method 900 may loop with the user providing new inputs to the toy and the game system, continuing the game.

Figure 10:
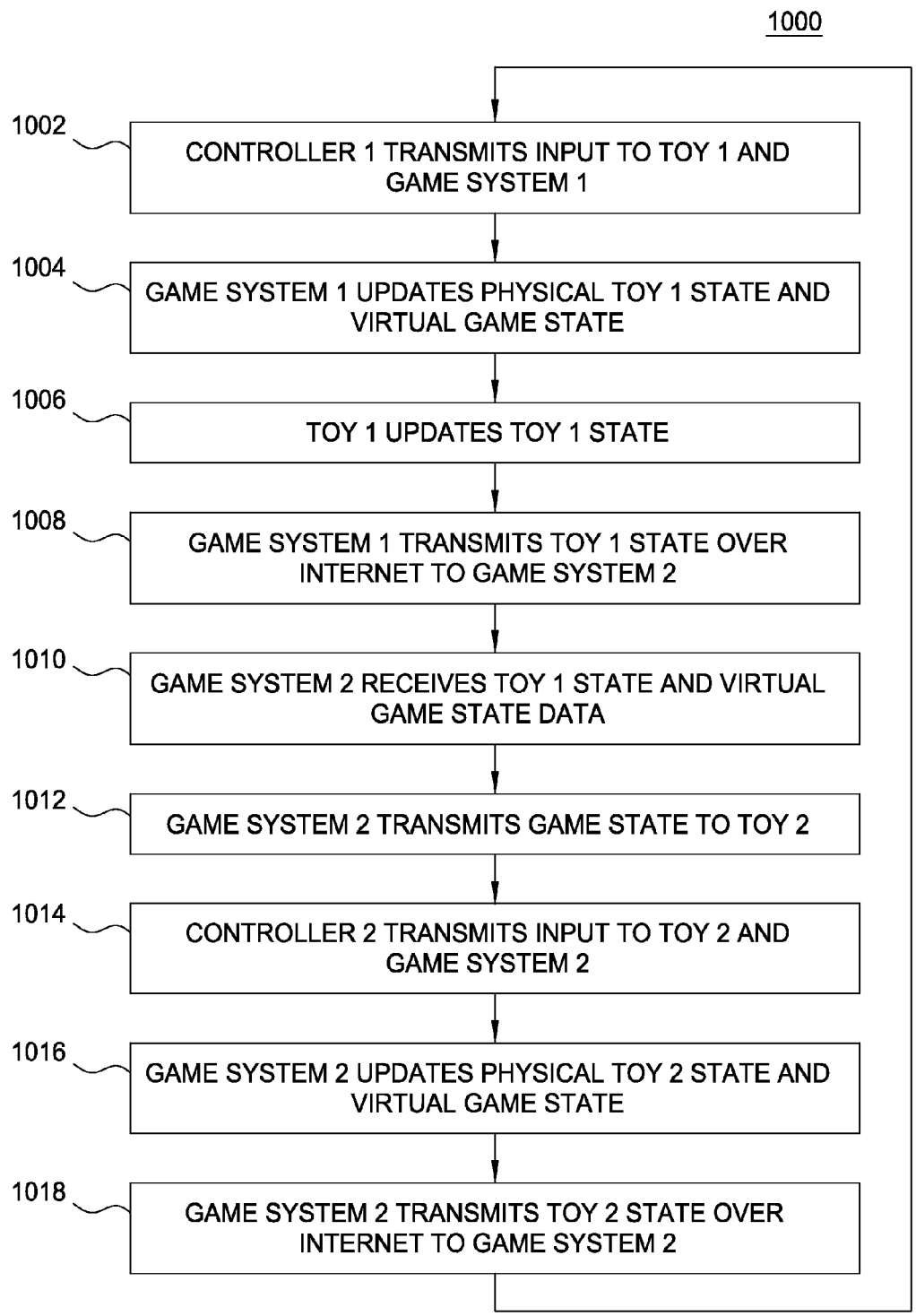
FIG. 10 illustrates a method for tracking physical play objects in a multi-player game configuration, according to one embodiment.

FIG. 10 illustrates a method 1000 for tracking physical play objects in a multi-player game configuration, according to one embodiment. As shown, the method 1000 begins at step 1002, where a player uses a first controller to transmit input to a first toy and a first game system, similar to the steps in FIG. 9. At 1004, the first game system updates a game state, causing the first toy to update an internal state at step 1006. At step 1008, the first game system transmits a state for toy state and the game state over a network connection to a second game system. At step 1010, the second game system receives the internal state for the first toy state and game state data informing the second game system of changes to the game due to the inputs from the first controller. At step 1012, the second game system transmits game state data to the second toy, leading to the second toy to update an internal state (as approaite for a given sequenced of game play). At step 1014, a player using the second game system reacts to changes by transmitting input to a second toy (and/or the second game system). At step 1016, actions of the player using the second game system are used to update the internal state of the second toy and the game state at the second game system. At step 1018, the second game system transmits a new game state over the network connection to the first game system. This completes one loop, and the method returns to step 1002 to process and subsequent inputs. Note, while FIG. 10 illustrates an embodiment with only two sets of game systems, toy devices and controllers, but additional toy devices and/or game systems may be connected to provide a multi-user game play experience. Further, while the network between systems may be connected over the internet, other ways transferring or transmitting information between toys or from game systems to toys, e.g., it could be local and done with Bluetooth or other local networking technology or protocols.

Figure 11:
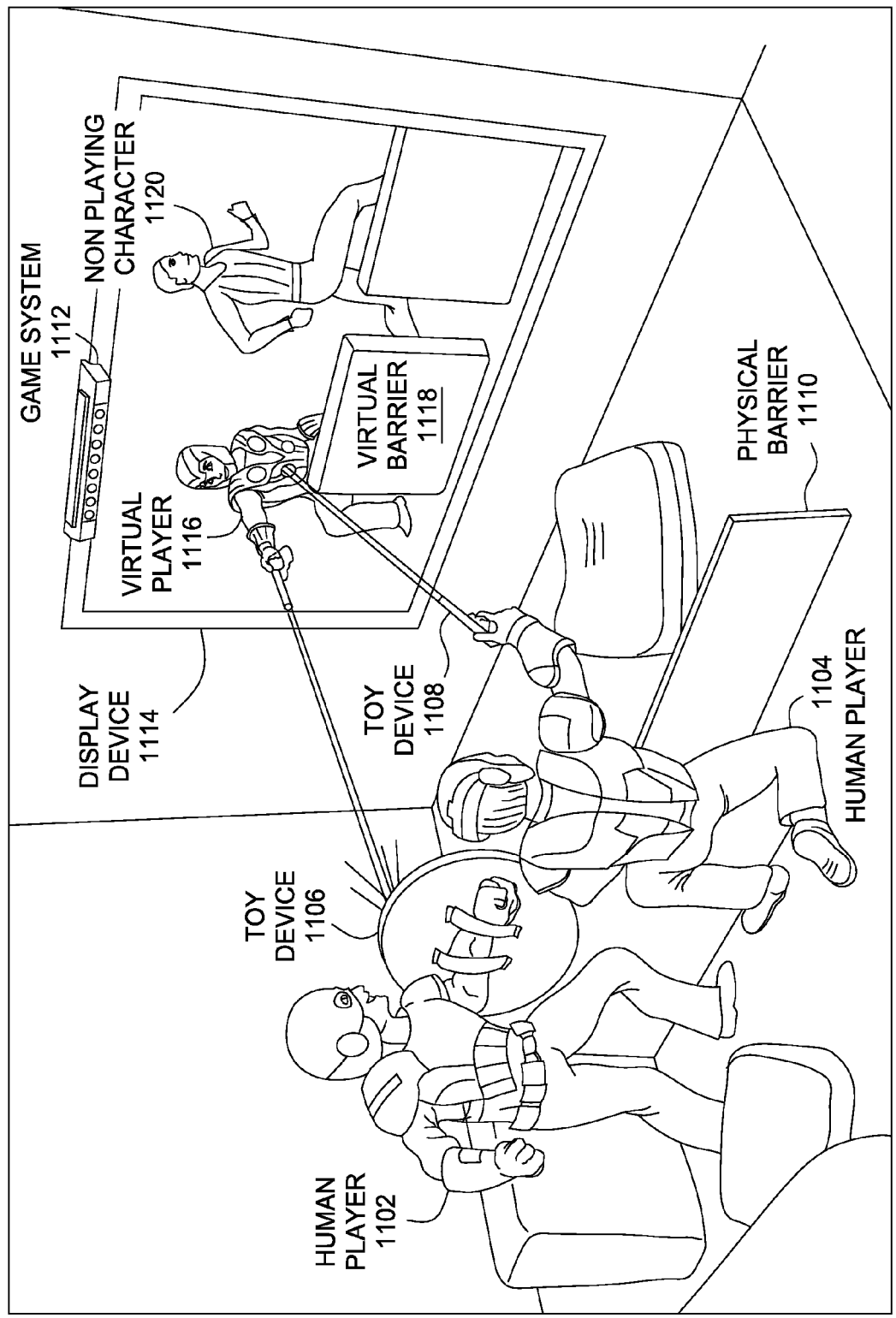
FIG. 11 illustrates another embodiment of a physical play object tracking system, according to one embodiment.

FIG. 11 illustrates another embodiment of a physical play object tracking system, according to one embodiment. As shown, a player 1102 and a player 1104 play a game using a game system 1112 (corresponding to game system 500 of FIG. 5). Game system 1112 is connected to a display device 1114, such as a television, to display the visual elements of the game. Player 1102 uses a toy device 1106, and player 1104 uses a toy device 1108. In one embodiment, the players 1102 and 1104 interact with a virtual player 1116, and a non-playing character 1120. In one embodiment, the virtual player 1116 is a computer-generated player. In another embodiment, the virtual player 1116 is an avatar for a player playing the game from another location, over a network connection.

As shown, toy device 1108 reacts to the inputs from player 1104 by emitting a beam of light that interpreted by the game system 1112 as a "shot" at a virtual opponent on the screen 1114. The game system 1112 tracks the position of the toy device 1108 and the emission of light from toy device 1108, and responds with in-game changes. In one embodiment, the game system 1112 may respond by rendering a non-playing character 1120 as apparently fleeing the virtual scene in response to perceived danger. In another embodiment, game system 1112 will use the input received due to the emission of light from toy device 1108 and react by causing the virtual player 1116 to be rendered to shoot back at the real player 1102. In one embodiment, the virtual player 1116 appears to target toy device 1106, because the game system registers toy device 1106 as a toy device that the game system 1106 can track.

In yet another embodiment, the game system 1112 is able to distinguish between compatible objects, such as toy device 1106 (a potential target), and incompatible objects, such as furniture. As a result, players 1102 and 1104 may use their physical environment to complement their game play. For example, to protect themselves from perceived attacks from virtual player 1116, players 1102 and 1104 may hide their toy devices 1106 and 1108 behind a physical barrier 1110. According to one embodiment, this will make their toy devices invisible and immune to perceived attack where the method of communication between the game system 1112 and the toy device 1106 is within the visible light spectrum. In a still further embodiment, the virtual player 1116 may appear to duck behind a virtual barrier 1118 on the display screen, thus making the virtual player 1116 invisible to the players' toy devices 1106 and 1108.

Further, game system 1112 may include a camera used to capture an image of players 1102 and 1104. Such an image may be rendered on a display to virtual player 1116. Such a camera may be used to stream video to a game system at the location of player 1116. Similarly, a camera on the game system at the location of player 1116 may include a camera capturing a video stream presented on display device 1114. While such video streams may be real-time video relayed via the camera of the game systems, the video streams may be processed using any number of CG effects to enhance game play presented on the displays both the real world environments. That is, the video streams exchanged between the two game systems present a virtual environment used to connect the two real-world environments. Of course, depending on the mechanics of a particular game, any number of systems may be conceded to a virtual environment. For example, in one embodiment, the video stream could be used to render players 1102 and 1104 in a virtualized environment presented to multiple users.

Of course, FIG. 11 shows only one embodiment of physical play object tracking. Other embodiments may include different numbers of human, virtual, or non-player characters. Still other embodiments may employ non-handheld toy devices being controlled by handheld controllers.

Physical play object tracking may be implemented using available hardware technology. For example, a user controller may be created using available output emitters and input sensors along with typical control devices such as buttons, and other required hardware. A toy device may be created with suitable sensors and emitters to receive and send input from and to the user controller and game system. Such a toy device could then respond to a game system running appropriate software that implements tracking. The software would have the ability to process toy tracking variables (e.g. speed, three-dimensional position, or other game variables like points, rankings, power levels etc.). The software would also need the ability to dynamically emit responses back to the toy device based on in-game changes.

Advantageously, embodiments presented herein provide a method for tracking physical objects by virtual players in an electronic game environment. By enabling a player to control a physical toy object that also responds to in-game events, the method allows for much greater player immersion in the game, compared to earlier techniques. The presence of a physical object in the player's own living room enhances the sensation that a player is truly integrated into the game, leading to a more rewarding and memorable gaming experience for the player. Player immersion rises further because the player may use the physical environment to complement game play through the physical toy object's interaction with other, non-toy objects in the environment.

While the foregoing is directed to embodiments of the present invention, other and further embodiments of the invention may be devised without departing from the basic scope thereof, and the scope thereof is determined by the claims that follow.

What is claimed is:

1. A method for providing an immersive physical and virtual interactive game play environment, the method comprising:
   receiving, by a first game console, tracking data from a physical toy object in the physical game play environment, wherein the physical toy object is controlled by a player interacting with a first controller;
   updating a game state of the virtual game play environment based on the received tracking data;
   transmitting game state data to the physical toy object;
   updating a current physical state of the physical toy object based on the game state data; and
   rendering images displayed on a first display based on the updated game state.

2. The method of claim 1, wherein the tracking data includes position and movement data for the physical toy object.

3. The method of claim 1, wherein updating the game state based on the received tracking data comprises updating a behavior of a non-player character in the electronic game to respond to actions of the physical toy object, as controlled by the player.

4. The method of claim 1, further comprising, transmitting, over a network, the received tracking data to a second game console, wherein the second game console renders a representation of the physical toy object.

5. The method of claim 4, wherein the second game console receives tracking data from a second physical toy object.

6. The method of claim 4, wherein the rendered images include a representation of the second toy object.

7. The method of claim 5, wherein the second game console transmits the tracking data received from the second physical toy object to the first game console, and wherein the first and second game consoles each update a respective game state based on the tracking data received from the second physical toy object.

8. A non-transitory computer-readable storage medium storing instructions, which when executed on a processor, perform an operation for providing an immersive physical and virtual interactive game environment, the operation comprising:
   receiving, by a first game console, tracking data from a physical toy object in the physical game play environment, wherein the physical toy object is controlled by a player interacting with a first controller;
   updating a game state of the virtual game play environment based on the received tracking data;
   transmitting game state data to the physical toy object;
   updating a current physical state of the physical toy object based on the game state data; and
   rendering images displayed on a first display based on the updated game state.

9. The computer-readable storage medium of claim 8, wherein the tracking data includes position and movement data for the physical toy object.

10. The computer-readable storage medium of claim 8, wherein updating the game state based on the received tracking data comprises updating a behavior of a non-player character in the electronic game to respond to actions of the physical toy object, as controlled by the player.

11. The computer-readable storage medium of claim 8, wherein the operation further comprises, transmitting, over a network, the received tracking data to a second game console, wherein the second game console renders a representation of the physical toy object on a second display.

12. The computer-readable storage medium of claim 11, wherein the second game console receives tracking data from a second physical toy object.

13. The computer-readable storage medium of claim 11, wherein the rendered images on the first display include a representation of the second toy object.

14. The computer-readable storage medium of claim 13, wherein the second game console transmits the tracking data received from the second physical toy object to the first game console, and wherein the first and second game consoles each update a respective game state based on the tracking data received from the second physical toy object.

15. A first game console system, comprising:
a processor;
a first controller in communication with the game console system;
a physical toy object, wherein the toy object is controlled via the first controller;
a memory storing an application program configured to perform an operation for providing an immersive physical and virtual interactive game environment, the operation comprising:
   receiving, by the first game console, tracking data from the physical toy object, as controlled by a first player interacting with the first controller,
   updating a game state of the virtual game play environment based on the received tracking data,
   transmitting game state data to the physical toy object,
   updating a current physical state of the toy object based on the game state data, and
   rendering images displayed on a first display based on the updated game state.

16. The system of claim 15, wherein the tracking data includes position and movement data for the physical toy object.

17. The system of claim 15, wherein updating the game state based on the received tracking data comprises updating a behavior of a non-player character in the electronic game to respond to actions of the physical toy object, as controlled by the player.

18. The system of claim 15, wherein the operation further comprises, transmitting, over a network, the received tracking data to a second game console, wherein the second game console renders a representation of the physical toy object on a second display.

19. The system of claim 18, wherein the second game console receives tracking data from a second physical toy object.

20. The system of claim 19, wherein the rendered images on the first display include a representation of the second physical toy object.

21. The system of claim 20, wherein the second game console transmits the tracking data received from the second physical toy object to the first game console, and wherein the first and second game consoles each update a respective game state based on the tracking data received from the second physical toy object.

22. A method for providing an immersive game environment, comprising:
   capturing, by a first camera controlled by a first game console, a video stream of at least a first player at a first location engaging in game play;
   rendering, at a second location, the video stream captured by the first camera on a display connected to a second game console;
   capturing, by a second camera controlled by the second game console, a video stream of at least a second player at the second location engaging in game play; and
   rendering the video stream captured by the second camera on a display connected to a first game console.

23. The method of claim 22, wherein one or more computer graphics (CG) effects are applied to the video stream captured by the first camera prior to being rendered on the display connected to the second game console.

24. The method of claim 22, wherein one or more computer graphics (CG) effects are applied to the video stream captured by the second camera prior to being rendered on the display connected to the first game console.

* * * * *